Figure 3:
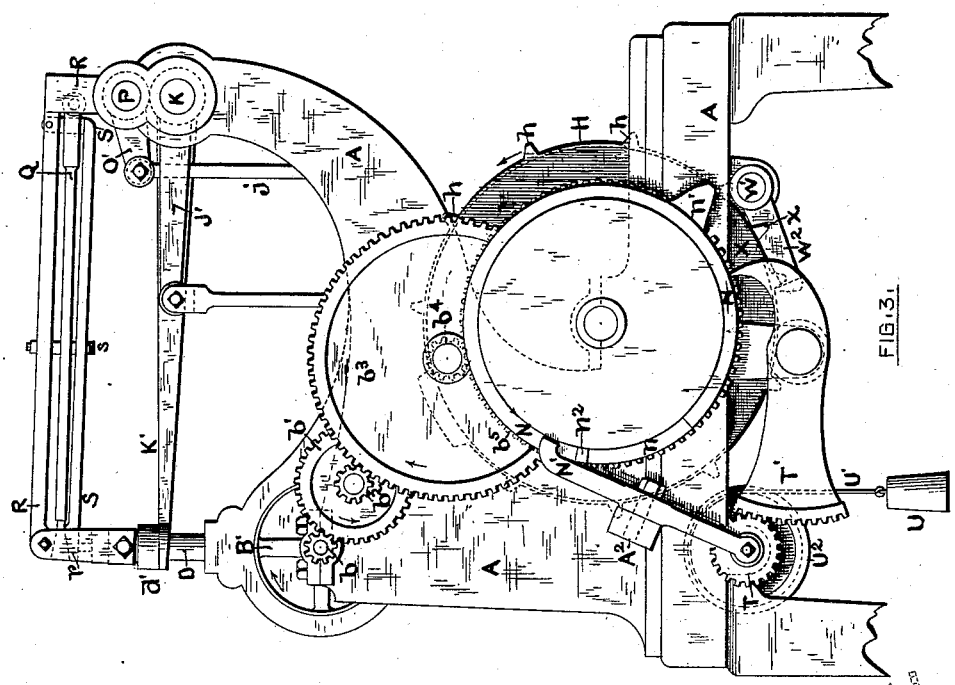

(Model.)
W. E. WARD.
MACHINE FOR TAPPING NUTS.
No. 255,478. Patented Mar. 28, 1882.
2 Sheets—Sheet 1.
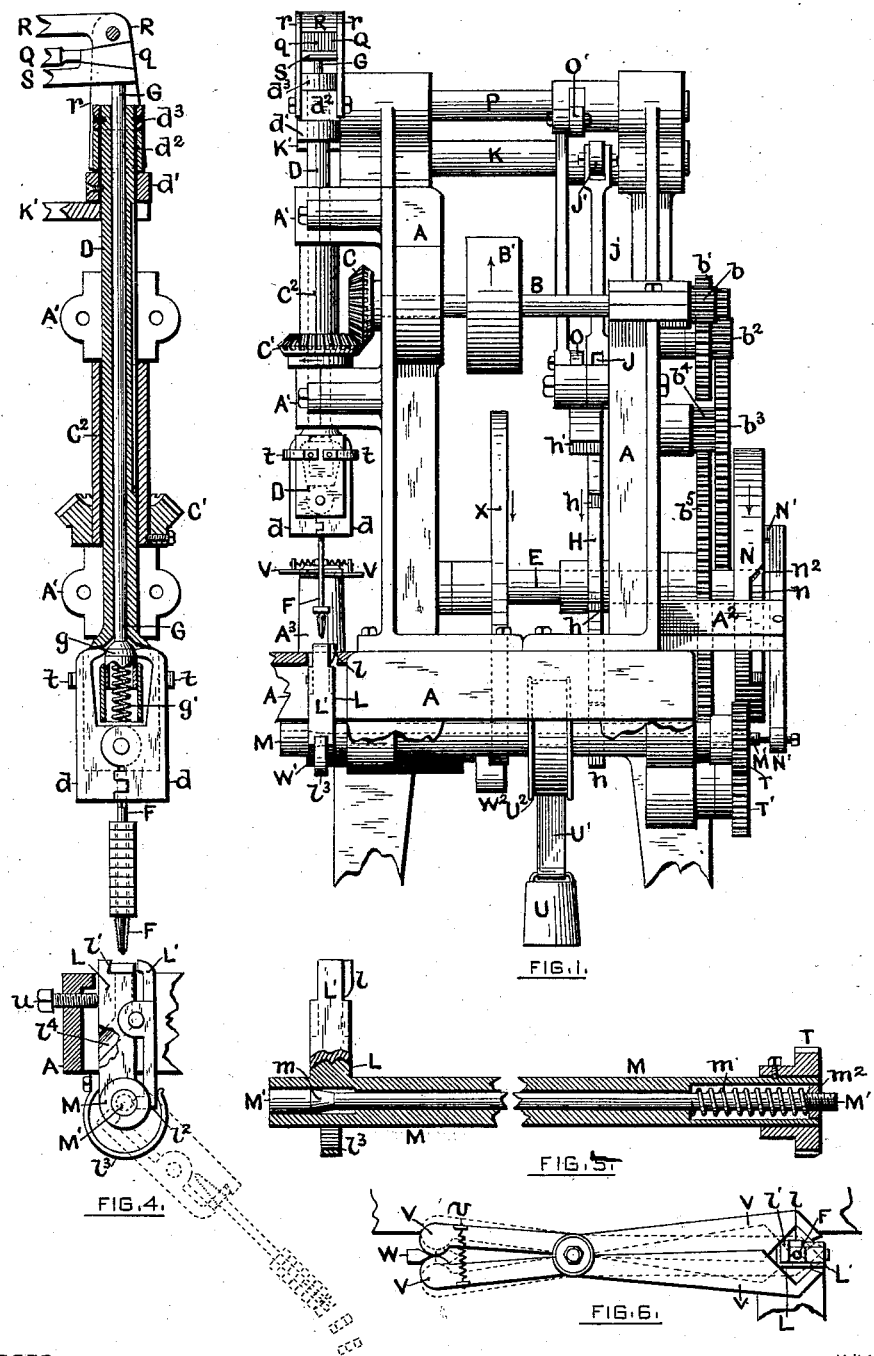
WITNESSES:
W. H. Thurston.
J. Knight.
INVENTOR:
Wm. E. Ward.

(Model.) 2 Sheets—Sheet 2.

W. E. WARD.
MACHINE FOR TAPPING NUTS.

No. 255,478. Patented Mar. 28, 1882.

WITNESSES:
W. H. Thurston.
J. Knight.

INVENTOR:
Wm. E. Ward

UNITED STATES PATENT OFFICE.

WILLIAM E. WARD, OF PORT CHESTER, NEW YORK.

MACHINE FOR TAPPING NUTS.

SPECIFICATION forming part of Letters Patent No. 255,478, dated March 28, 1882.

Application filed June 6, 1881. (Model.)

*To all whom it may concern:*

Be it known that I, WILLIAM E. WARD, of Port Chester, county of Westchester, State of New York, have invented a new and useful Improvement in Machines for Tapping Nuts; and I do hereby declare that the following specification, taken in connection with the accompanying drawings, forming a part of the same, is a full, clear, and exact description thereof.

My invention relates to a nut-tapping machine in which the tap revolves continuously in one direction, and the threaded nuts pass onto the shank of the tap and are discharged over its shank end.

My improvement consists in organizing such a machine so that the tap will be automatically released and clamped by jaws upon the tap-spindle; in providing the nut-blank receiver with a movable jaw, which at a certain time is made to clamp a nut-blank and hold the same while being partially threaded, and also to hold both the said nut-blank and the tap therein in connection with said receiver during the discharge of the threaded nuts from the tap-shank; and in mounting the nut-blank receiver so that it can be rocked in a vertical plane to discharge the threaded nuts from the shank of the tap while said tap and the partially-threaded nut-blank with which it is engaged are held by said receiver, and so that it will return the tap to a position where it can be again seized by the revolving tap spindle jaws.

From the detailed description of the machine hereinafter given it will be understood that its general mode of operation is as follows: A quantity of nut-blanks are supplied to the machine from a stack or otherwise, so that the last blank in the series can be introduced into a receiver which prevents the blank from rotating while being threaded. A tap for threading the nut-blanks is located in alignment with the axis of the nut-blank in the receiver, and is made to revolve in one direction so as to thread each nut-blank in succession, and the shank of such tap is held between clamping-jaws during the time that it is performing its work. As each nut-blank is threaded it is run onto the shank of the tap until any convenient number—say ten—have been collected thereon. After each nut-blank is threaded, the tap and the spindle to which it is clamped are raised high enough to permit a new blank to be introduced into the receiver, and the tap is again returned to perform its office. After the prescribed number of nuts have been collected on the shank of the tap, and while the tap is engaged in threading another blank, which blank has been clamped in the receiver, the griping-jaws which have hitherto held the tap are opened and retreated clear of the tap. The receiver, now holding the threaded end of the tap through the medium of its connection with the blank which it has partially threaded, is then rotated so as nearly to invert the tap and enable the nuts which have been collected upon the shank to be discharged by their gravity. This partial rotation of the receiver causes a weight or equivalent spring to be wound up, thereby furnishing a power which is subsequently permitted to act to return the receiver to its original position, whereupon the griping-jaws again take hold of the tap-shank, the blank which has been locked in the receiver by the clamping-jaw is released, and the foregoing operations are repeated.

Figure 2:
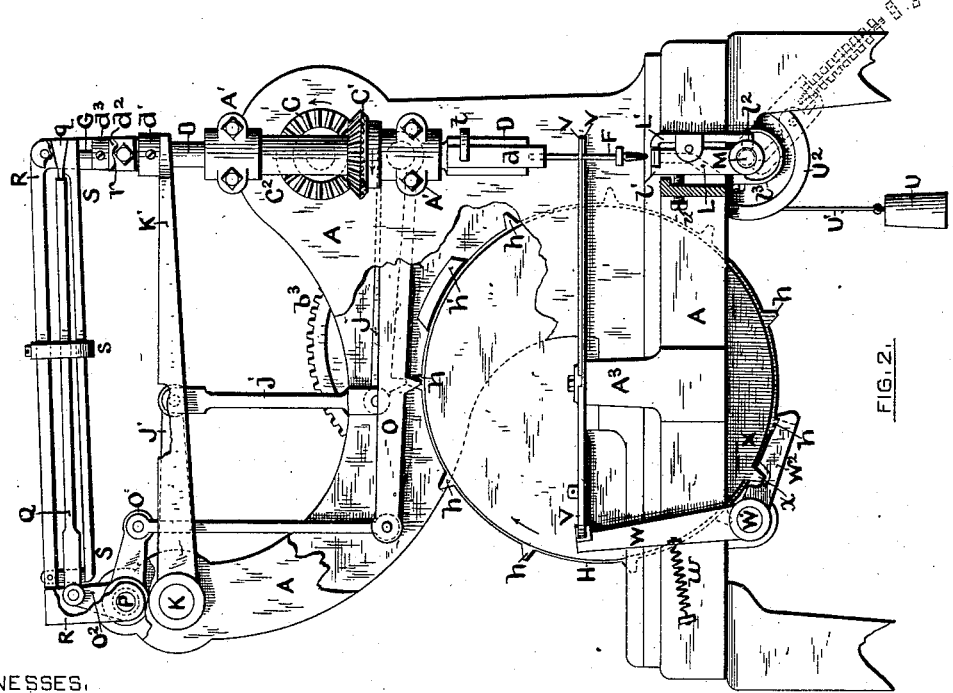

Referring to the drawings, Figure 1 represents, in side elevation, a machine embodying my improvement. Figs. 2 and 3 show respectively front and rear elevations of the same. Fig. 4 represents, in detail, the tap-spindle and nut-blank receiver; and Figs. 5 and 6 show details of the parts.

A is the frame of the machine, in and upon which the various parts are mounted.

B is the driving-shaft, which is provided with a pulley, B', to give it rotation, and bears upon one end a bevel-gear, C, which meshes with a gear, C', secured to a sleeve, $C^2$. This sleeve is splined to the tap-spindle D, as shown in Fig. 4, and said spindle is mounted to rotate and slide vertically in bearings A' A'. The opposite end of the shaft B carries a pinion, $b$, which drives the cam-shaft E through a train of gears, $b'$ $b^2$ $b^3$ $b^4$ $b^5$.

F is the tap, which is held by a pair of jaws, $d$ $d$, pivoted in the end of the tap-spindle D. The upper ends of these jaws are bent inward and engage a conical portion, $g$, on a rod, G, which occupies the axis of the tap-spindle, as shown in Fig. 4. The rod G is moved upward to close the jaws $d$ $d$ upon the tap by a spring, $g'$, which bears upon the end of said rod and upon a portion of the spindle. The tap-spindle D is continuously revolved in one direction by the driving-shaft B. Its downward movement is produced by gravity, and its upward or retreating movement by a cam, H, having teeth $h$ upon its periphery. These teeth $h$ consecutively engage a lever, J, Fig. 2, pivoted to the frame of the machine, and said lever is connected by a link, $j$, to an arm, J', secured to a rock-shaft, K. Mounted on said rock-shaft is a second arm, K', whose bifurcated end forks the tap-spindle and engages a collar, $d'$, secured thereto. The engagement of a tooth $h$ with the lever J therefore elevates or retreats the tap-spindle, which movement takes place after a nut-blank has been threaded and has passed onto the shank of the tap.

The nut-blanks are fed, one at a time, by hand or by any convenient mechanism, to the receiver L, which is mounted upon and secured to a rock-shaft, M, as shown in Figs. 1, 2, 4, and 5. This receiver is provided with a gage, $l$, Figs. 1 and 5, against which the nuts are fed, and it is also provided with an upwardly-projecting lip, $l'$, of a greater height than the thickness of the nut-blanks, and preferably having a beveled face. Pivoted to the receiver L is a finger or jaw, L', whose lower end, $l^2$, is bent and passes into a slot in the holder L, as shown in Figs. 2 and 4. When this jaw is in a normal position its bent end $l^2$ rests upon the smaller diameter of a cone, $m$, upon a rod, M', which rod occupies the interior of the hollow rock-shaft M, as shown in Fig. 5, the jaw end $l^2$ being held in engagement with the cone $m$ by the spring $l^3$.

The operation of tapping is as follows: A nut-blank is fed into the receiver, where it is loosely held against rotation by the lip $l'$, gage $l$, and the upper end of the jaw L'. The revolving tap and its spindle descend by gravity, the contour of the cam H allowing, and the nut-blank is threaded and passes onto the shank of the tap. One of the teeth $h$ on the cam H now engages the lever J and raises the tap-spindle, the nut passing upward with the tap and remaining upon its shank. A duct, $l^4$, Fig. 4, is provided in the receiver L, for the discharge of the chips. For the sake of economy in time each nut is not discharged from the shank of the tap as soon as it is threaded. The discharge does not take place until the shank of the tap has received about as many nuts as it will accommodate.

The machine, as shown in the drawings, is constructed to discharge ten nuts at a time, the cam H being provided with ten of the teeth $h$, which will successively operate to raise the tap-spindle before the discharging mechanism comes into action. The teeth $h$ are located at such a distance from each other on the periphery of the cam H that between the time of the engagement of two consecutive teeth with the lever J the threaded portion of the tap passes entirely through a nut-blank, thereby completely threading the same and bringing such threaded blank onto the shank of the tap.

From the foregoing description it will be understood that the constantly-revolving tap-spindle is free to move upward and downward in its bearings. It will also be understood that the tap is brought into engagement with a nut-blank by the gravity of said spindle and the parts mounted thereon, and that the continued downward movement of the tap while it is performing its work is due to the same force, assisted by the lead of the thread being cut. After the ten nut-blanks have been threaded, and before their discharge is effected, another nut-blank is fed to the receiver, and the tap descends and partially threads the same. Before the tap engages this nut-blank, however, the jaw L' is made to clamp the blank between its upper end and the lip $l'$ by a longitudinal movement of the rod M'. This movement is produced by a spring, $m'$, which bears upon a shoulder upon the rock-shaft M and against a nut, $m^2$, on the rod M', as shown in Fig. 5. During the threading of the ten nut-blanks the rod M' will be held in the position shown in Fig. 5 by a side cam, N, Fig. 3, the greater portion of whose face lies in the same plane. This cam is engaged by one end of a lever, N', pivoted to a stud, A², upon the frame of the machine. The other end of this lever is provided with a set-screw which engages the rod M', as shown in Fig. 1. When the cam N has revolved so that its depression $n$ is presented to the lever N', however, the spring $m'$ will slide the rod rearward, and its conical portion $m$ will cause the jaw L' to gripe the eleventh nut-blank and firmly hold the same while being partially tapped. When this nut-blank has been partially tapped the jaws $d$ $d$ release the tap and the spindle rises to clear it. The releasing of the tap is effected by a tooth, $h'$, on the cam H, Figs. 1 and 2, which tooth engages a lever, O, pivoted to the frame of the machine. This lever is linked to an arm, O', which is secured to a rock-shaft, P. The shaft P bears another arm, O², Fig. 2, to which is pivoted a rod, Q, having a wedge-shaped outer end, $q$. The end $q$ of the rod Q lies between the inclined faces of the ends of two arms, R S, the said parts being retained in engagement by a spring, $s$.

The arm or rod R has its rear end bifurcated and loosely mounted upon the shaft P, while its opposite end is connected by two links, $r$ $r$, with a collar, $d^2$, loosely mounted on the tap-spindle between two fixed collars, $d'$ $d^3$, as shown in Figs. 1, 2, and 4. When the tooth $h'$ engages the lever O it acts to move the rod Q rearward. The rearward movement of this rod depresses the free end of the arm S, which is engaged by the upper end of the rod G. When the rod G moves downward the springs $t$ $t$ move the bent ends of the jaws $d$ $d$ inward, the shape of the cone $g$ on the rod G allowing, and the tap is released. So soon as the tap is released the tooth $h'$ engages the lever J and raises the jaws $d$ $d$ clear of the tap. The nuts on the shank of the tap can now be discharged by a partial rotation of the nut-receiver to a position shown by dotted lines in Figs. 2 and 4, the tap being held to the receiver L by its engagement with the nut-blank clamped therein. This discharge is effected by a partial rotation of the shaft M, which bears a gear, T, upon its end, as shown in Figs. 1, 3, and 5. This gear is engaged by a segmental gear upon a lever, T', which is pivoted to the frame of the machine, as shown in Fig. 3. The rear end of the lever T' is engaged by a tooth, n', on the cam N, which depresses said end of the lever, rocks the shaft M, and causes the nuts to be discharged from the shank of the tap by their gravity and by centrifugal force.

The return of the nut-blank receiver and the tap to a vertical or normal position is effected by a weight, U, secured to a strap, U', which passes over and is attached to a pulley, $U^2$, upon the shaft M. When the nuts are discharged by the partial rotation of the nut-blank receiver this weight is wound up, so that when the cam-tooth n' allows the weight U rocks the shaft in an opposite direction and brings the nut-receiver and tap into a vertical position, the proper position of the receiver being determined by a set-screw, u. (Shown in Figs. 2 and 4.) If desired, however, the weight U may be dispensed with and its functions be performed by positive means—as, for instance, by providing the cam N with a side groove and supplying the rear end of the lever T' with a roller which engages the groove. With such a construction the movements of the nut-blank receiver would be positively controlled by said cam. The tap is now in position to be seized by the jaws $d\ d$; but in order to insure its vertical alignment with the tap-spindle, I prefer to employ a pair of centering-fingers, V V, Figs. 1, 2, and 6, which are mounted in a horizontal plane upon a stud, $A^3$, as shown in Figs. 1 and 2. The front ends of these fingers are bent, as shown in Fig. 6, and said ends are normally separated by a spring, v, which brings their rear ends into contact. The fingers V V at a proper time are closed upon the shank of the tap to align it by the wedge-shaped end of an arm, W, Figs. 2 and 6, which is secured to a rock-shaft, W'. Also secured to the shaft W' is a second arm, $W^2$, whose end lies in the path of a tooth, x, on the cam X, Figs. 1, 2, and 3. When the cam-tooth x engages the end of the arm $W^2$ the wedge-shaped end of the arm W is forced between the rear ends of the centering-fingers V V, thereby closing the forward ends of the fingers upon the shank of the tap and aligning the same with the tap-spindle. The spindle now promptly descends, the cam-tooth h' ceasing to act upon the lever J. The cam-tooth h' now ceases to act upon the lever O, which descends by gravity and moves forward the rod Q, thereby allowing the spring g' to elevate the rod G and cause its conical portion g to close the jaws $d\ d$ upon the tap-shank. As soon as this is effected the cam-tooth x ceases to act upon the arm $W^2$, the wedge-shaped end of the arm W is withdrawn from between the rear ends of the fingers V V by a spring, w, Fig. 2, and the fingers are opened by the spring v. Simultaneously the rising face $n^2$ of the cam N causes the lever N' to move the rod M' forward and allow the spring $l^3$ to tilt the jaw L' and unclamp the nut-blank. The threading of this blank is now continued, the nut passes onto the shank of the tap, and the operations above described are repeated.

The exact time at which a nut-blank is clamped to the receiver by the jaw L' may be varied from that described, if desired.

I do not limit myself to the precise arrangement and construction of the parts of the machine as described, but mean to include all mere formal variations of structure performing the same mode of operation by equivalent means.

What I claim as my invention, and desire to secure by Letters Patent, is—

1. The combination, as before set forth, of a receiver adapted to hold nut-blanks, one by one in succession, a tap secured to a revolving holder by clamping-jaws while it is threading a series of blanks, one after the other, mechanism for releasing the tap from its revolving holder while the last blank in the series is being threaded, mechanism for clamping such last-named blank with the tap engaged therewith to the receiver, and mechanism for partially rotating the receiver and tap held therein, to enable the fully-threaded nuts to be discharged from the shank end of the tap by gravity.

2. The combination, as before set forth, of the nut-blank receiver, mechanism for partially rotating the same to permit the finished nuts to be discharged from the shank end of the tap while the screw end of the tap is held in said receiver, and mechanism, substantially as described, for returning the receiver and the tap to their normal positions.

3. The combination, as before set forth, of the rotating and longitudinally-reciprocating tap-holder, the nut-blank receiver, and mechanism, substantially as described, for partially rotating said receiver in opposite directions, or vibrating the same at stated periods relatively to the movement of the tap-holder.

4. The combination, as before set forth, of the revolving tap-holder, the partially-rotating nut-blank receiver, and centering-fingers for putting the tap into alignment with said tap-holder when the tap is to be restored to the control of its holding-jaws.

5. The combination, with the nut-blank receiver provided with the jaw L', of the rod M', having a cam, m, the spring m', for moving said rod in one direction, and the cam N and lever N', for moving it in the opposite direction, substantially as set forth.

6. The combination, with the sleeve $C^2$, and the tap-spindle D, splined thereto and provided with clamping-jaws to hold a tap, of the axial rod G, having a cam, g, the spring g', and the bars Q R S, substantially as and for the purposes specified.

WM. E. WARD.

Witnesses:
W. H. THURSTON,
I. KNIGHT.